(No Model.)
F. L. JOHNS.
HAY RACK.
No. 329,047. Patented Oct. 27, 1885.
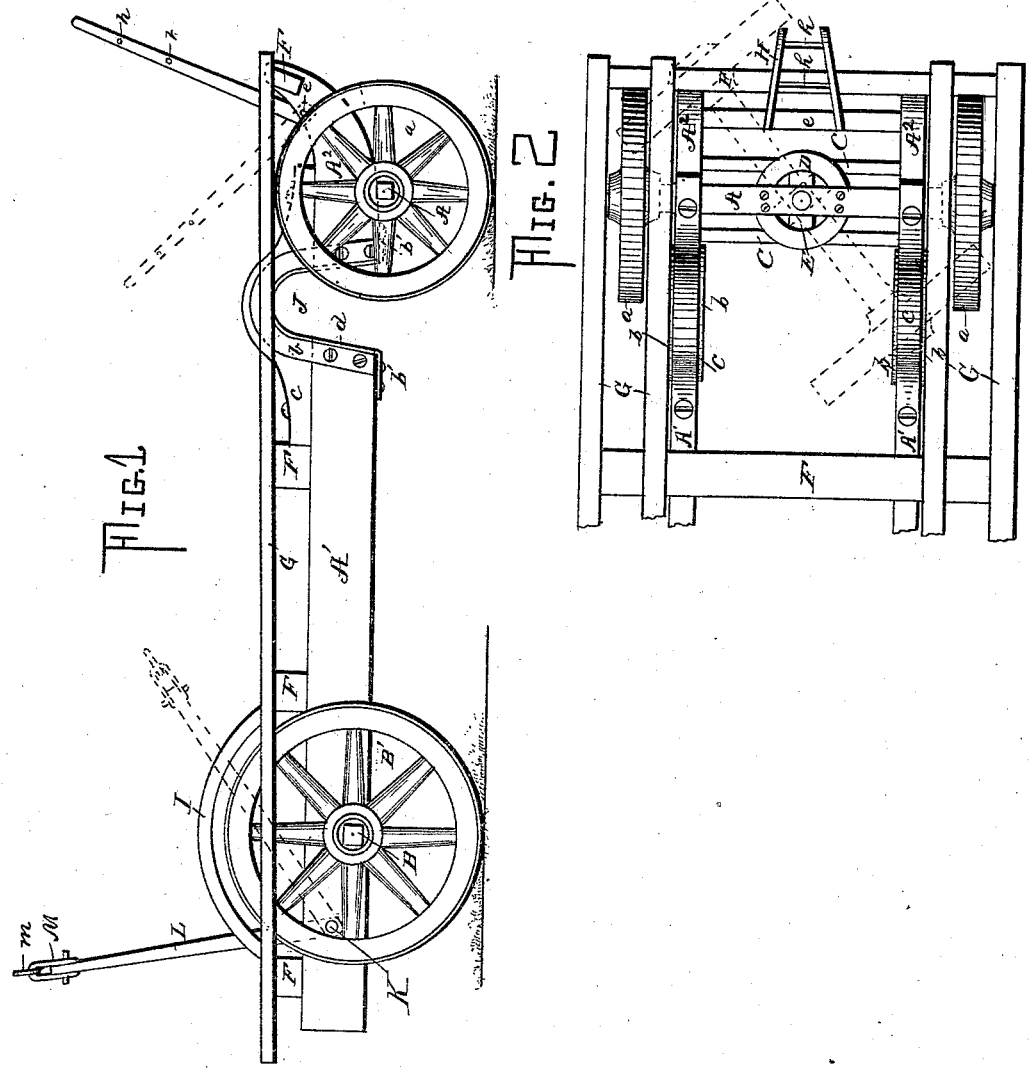
WITNESSES
G. P. Kramer.
R. W. Bishop.
INVENTOR
Frank L. Johns
By R.S. & A.P. Lacey
Attorneys.

UNITED STATES PATENT OFFICE.

FRANK L. JOHNS, OF CLAY CITY, INDIANA, ASSIGNOR OF TWO-THIRDS TO J. H. MODRELL AND J. P. BRADFORD, OF SAME PLACE.

HAY-RACK.

SPECIFICATION forming part of Letters Patent No. 329,047, dated October 27, 1885.

Application filed July 25, 1885. Serial No. 172,683. (No model.)

*To all whom it may concern:*

Be it known that I, FRANK L. JOHNS, a citizen of the United States, residing at Clay City, in the county of Clay and State of Indiana, have invented certain new and useful Improvements in Hay-Racks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in hay-racks, and has for its object to simplify and cheapen the construction and increase the durability of the same. To these ends and to such others as the invention may pertain, it consists in the peculiar combinations and the novel construction and arrangement of parts, all as hereinafter more fully described, and then specifically defined by the appended claim.

In the accompanying drawings, Figure 1 is a side elevation of my improved rack. Fig. 2 is a top plan of the forward portion of the same.

Heretofore one great trouble in devices of this kind has been that the wheels when passing over a rough road or turning a corner rub against the bed of the wagon, mar the same, tend to tip it over by running under it if empty, or, if there is a load on the rack, straining and bending the axle, or locking the wheels, or endanger the breaking of the tongue. Various methods have been devised for overcoming this difficulty, but so far they have been found objectionable for various reasons. My construction accomplishes the desired result in a simple manner and does not add to the cost of the rack.

Referring to the drawings by letter, A represents the forward axle, $a$ the front wheels, B the hind axle, and B' the rear wheels, all of ordinary construction. C are the bolsters, D the fifth-wheel, and E the head-block, all of which may be of any approved and well-known form.

The sill or bed-piece is made in two parts, A' A², united as hereinafter set forth. The forward end of the latter is bent upward, as shown, so that the front wheel may pass under it without striking, and which will at the same time form a support for the forward end of the side rails. To these bed-pieces I fasten in any suitable manner the cross-bars F, and to the outer ends of these cross-bars I secure the longitudinal bars G, forming the bottom of the rack and a support for the hay. Near the upper forward ends of the bed-pieces A' is pivotally secured a shaft, $e$, to which is secured the pole-support H, provided with cross-bars $h$ in the usual manner. When not in use, this support may be turned down out of the way, as shown in dotted lines in Fig. 1.

Upon either side of the rack, at the rear end between the rails G, are secured in any convenient way the wheel-guard I. The bed-pieces are secured to the axle in any manner found most convenient, and just back of their connection with the front axle the two parts are united to form an arch, J, the object of which is to allow the front wheels to pass under the rack in turning without straining the axle or cutting into the bed-pieces. Each arch is formed by separating the parts A' A² of the bed-piece, and uniting them by a block, $c$, bolted or otherwise secured to the upper side or top of the parts. The sides of the top come flush with the sides of the sill, and it is cut away on its under side to increase the height of the arch. Inverted-U-shaped irons or bands $b$ are bolted to the sides of the sill and extend on either side of and embrace the sides of the block. The inner edge of these irons or bands follows the contour of the arch. These bands, it will be noticed, extend up beyond the top of the pieces of the sill and serve to keep in place and prevent lateral displacement of the blocks $c$, which are slightly arched, as shown, and extended across the opening between the two pieces, and are rigidly secured thereto, so as to unite and strengthen the same. The arch thus formed is lined upon the under side by the metal piece or pieces $d$, bent to the shape required, and provided with the flanges $b'$, extending under and secured to the under side of the pieces, as shown in Fig. 1.

It will be seen that by this construction the wheels can pass under the rack, no matter how heavy the load, without in the least interfering with the bed-pieces, the wheels passing under the arch and under the front bent-up ends of the bed-pieces, as shown by dotted lines, Fig. 2.

K is a shaft journaled at the rear ends of the rack between the bed-pieces A', and to this shaft is secured the ladder L. Over this ladder or stake I pass a square binding-loop, M, which carries a hook, m.

The operation of this part of my device will be readily understood.

Having thus described my invention, what I claim, and desire to secure by Letters Patent, is—

In a hay-rack, an arched bed-piece or sill for the purposes described, consisting of parts A' A², the latter having an upward curved forward end, the adjacent ends of the two parts being at a distance apart, an arched block, c, uniting the parts, inverted-U-shaped bands b, bolted on either side of and extended beyond the top of the parts of the sill, to prevent lateral displacement of the block and define the inner contour of the arch, and the metal piece d, lining the arch formed between the parts A' A², and provided with flanges b', extending beneath the parts, by which it is secured in place, all combined, arranged, and operating substantially as shown and described.

In testimony whereof I affix my signature in presence of two witnesses.

FRANK L. JOHNS.

Witnesses:
HENRY CLYMER,
WM. GRABER.